(12) United States Patent
Balavalikar Krishnamurthy et al.

(10) Patent No.: US 12,412,421 B2
(45) Date of Patent: Sep. 9, 2025

(54) ASSIGNMENT OF UNIQUE IDENTIFICATIONS TO PEOPLE IN MULTI-CAMERA FIELD OF VIEW

(71) Applicant: Hewlett-Packard Development Company, L.P., Spring, TX (US)

(72) Inventors: Raghavendra Balavalikar Krishnamurthy, Austin, TX (US); Rajen Bhatt, Pittsburgh, PA (US); Kui Zhang, Austin, TX (US); David A. Bryan, Austin, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 456 days.

(21) Appl. No.: 17/971,243

(22) Filed: Feb. 5, 2023

(65) Prior Publication Data
US 2024/0135748 A1   Apr. 25, 2024

(51) Int. Cl.
G06K 9/00       (2022.01)
G06T 7/70       (2017.01)
G06V 40/16      (2022.01)

(52) U.S. Cl.
CPC .............. *G06V 40/172* (2022.01); *G06T 7/70* (2017.01); *G06T 2207/20084* (2013.01); *G06T 2207/30242* (2013.01)

(58) Field of Classification Search
CPC .................... G06V 40/00; G06V 10/00; G06T 2207/20084; G06T 7/70
See application file for complete search history.

(56) References Cited

U.S. PATENT DOCUMENTS

| 10,999,531 B1 | 5/2021 | Bryan et al. |
| 11,106,919 B1* | 8/2021 | Balogh ................. G06F 9/4843 |
| 2008/0187174 A1* | 8/2008 | Metaxas ............ G06V 10/7715 |
| | | 382/103 |

(Continued)

OTHER PUBLICATIONS

Suruliandi Andavar et al., Person re-identification based on pose angle estimation and multi-feature extraction, The Institution of Engineering and Technology, IET Biom. 2018, vol. 7, Issue 4, pp. 365-370, Nov. 7, 2017.

(Continued)

*Primary Examiner* — Hadi Akhavannik
(74) *Attorney, Agent, or Firm* — Quarles & Brady LLP

(57) ABSTRACT

A multi-camera video conference call system is provided with a plurality of cameras connected together over a communication network to generate a corresponding plurality of input frame images taken from different perspectives of a video conference room, where the multi-camera video conference call system detects one or more human heads for any meeting participants captured in the input frame images, generates a head bounding box which surrounds each detected human head, extracts a body bounding box which surrounds the detected human head and at least an upper body portion of a meeting participant belonging to the detected human head, generates a participant identification feature embedding from each body bounding box, and performs person re-identification processing on all generated participant identification feature embeddings to determine a count of the meeting participants in the video conference room.

18 Claims, 8 Drawing Sheets

(56) References Cited

U.S. PATENT DOCUMENTS

| | | | |
|---|---|---|---|
| 2013/0022263 A1* | 1/2013 | Metaxas | G06V 40/176 |
| | | | 382/190 |
| 2018/0330175 A1* | 11/2018 | Corcoran | G06V 10/147 |
| 2019/0007623 A1* | 1/2019 | Wang | H04N 7/147 |
| 2019/0244028 A1* | 8/2019 | Jones | G06V 10/454 |
| 2022/0262093 A1* | 8/2022 | Zhou | G06V 40/113 |
| 2022/0335626 A1* | 10/2022 | Bottos | G06T 7/20 |
| 2023/0196586 A1* | 6/2023 | Sun | G06V 10/62 |
| | | | 382/107 |
| 2024/0135748 A1* | 4/2024 | Balavalikar Krishnamurthy | |
| | | | G06V 40/172 |

OTHER PUBLICATIONS

X. Liu et al., Introducing scene understanding to person re-identification using a spatio-temporal multi-camera model, paper presented at IS&T International Symposium on Electronic Imaging 2020, Image Processing: Algorithms and Systems XVIII, Burlingame, Jan. 26-Jan. 30, 2020.

Kaiyang Zhou et al., Omni-Scale Feature Learning for Person Re-Identification, 2019 IEEE/CVF International Conference on Computer Vision (ICCV), Oct. 27-Nov. 2, 2019.

\* cited by examiner

ASSIGNMENT OF UNIQUE IDENTIFICATIONS TO PEOPLE IN MULTI-CAMERA FIELD OF VIEW

BACKGROUND

Technical Field

This disclosure is directed in general to videoconferencing. In one aspect, the disclosure relates to techniques for correctly identifying unique meeting participants in a multi-camera video conference.

Description of the Related Art

Video conferencing systems provide an efficient and effective way to reduce barriers for connecting multiple people at one or more other videoconferencing endpoints. However, when video conferences are conducted in large rooms, multiple cameras are required to provide the best coverage of all participants in the room. To provide the best coverage, a multi-camera system also needs to ensure that the video conferencing system sends the best view of each person in the room. However, when multi-camera systems have overlapping fields of view between different cameras, individual participants may be viewed and detected by more than one camera. For example, if there are five participants in a conference meeting room which has three separate cameras, each camera may detect five participants from the different perspective of each camera, resulting in a total of fifteen detected participants when in fact there are only five.

There are many technical challenges with configuring the multi-camera video conference system to encode the video conference call into a gallery view of participants with best view of every participant from each camera without any duplication due to overlap of camera field of views. These challenges include, but are not limited to, identifying human participants in the meeting room, capturing the best view of each participant, correctly identifying unique participants in the meeting room, determining the total number of unique participants in the meeting room, reporting an accurate count of the meeting participants in the room, and being able to solve these challenges in a computationally efficient and accurate way. While there are single-camera video conferencing tools that automatically select and frame the optimal view for transmission to a remote endpoint based primarily on who is currently speaking, such systems are not satisfactory in meeting the requirements of multi-camera video conferencing applications because they are not able to uniquely identify each participant detected with different camera views, identify the best view for each identified participant from the plurality of captured views, and report an accurate count of the participants in the room. As seen from the foregoing, existing video conferencing room systems suffer from a number of design drawbacks and performance deficiencies.

SUMMARY

A method, apparatus, system, and computer program product are provided for correctly determining the total number of unique participants in multi-camera meeting room by generating and assigning unique ID values or signatures to each participant detected in multi-camera field of view images, and then processing the unique ID values to identify and eliminate duplicate camera images for each meeting participant. In operation, each camera (or a centralized codec or computing device) in the multi-camera system may be provided with a human head detector machine learning model which is trained to detect or classify human heads from input camera video frame or image data, and to identify, for each detected human head, a head bounding box with specified image plane coordinate and dimension information. In addition, each camera (or a centralized codec or computing device) may be configured to process each identified head bounding box by extracting a corresponding body bounding box, such as by extending the head bounding box by predetermined pixel distances in both vertical and horizontal directions. Each camera (or a centralized codec or computing device) may also be configured to compute a signature or embedding from the image region of interest contained in the body bounding box, so that each participant detected within the body bounding box of the input camera video frame or image data has a corresponding signature or embedding. As disclosed herein, any suitable feature embedding technique may be used to compute the signature or embedding, such as the Omni-Scale Network (OSNet) feature learning tool for creating a feature embedding which can be used with a person re-identification task of associating images of the same person taken from different camera perspectives. In embodiments where each camera generates a signature or embedding from each body bounding box, each camera may then transfer the signature/embedding to a centralized codec (or computing device) which processes the signature/embeddings collected from different cameras to identify detections for the same meeting participant and to eliminate duplicate camera images for each meeting participant. In an example embodiment, a codec located at a primary camera generates "query" embeddings from the signature/embedding value generated by the primary camera. In addition, the codec may receive "gallery" embeddings from the signature/embedding value(s) generated by each secondary camera (or may generate the "gallery" embeddings for detection from the secondary cameras that are not smart cameras). And by comparing the "query" and "gallery" signature/embeddings, the codec identifies the top or closest matches (e.g., by using Euclidean distance or cosine distance computations) so that matching embeddings are assigned to the same meeting participant, thereby "de-duplicating" the duplicate camera images for each meeting participant so that an accurate count of the participants in the room can be determined.

BRIEF DESCRIPTION OF THE DRAWINGS

The present disclosure may be understood, and its numerous objects, features and advantages obtained, when the following detailed description of a preferred embodiment is considered in conjunction with the following drawings.

DETAILED DESCRIPTION

Figure 1:
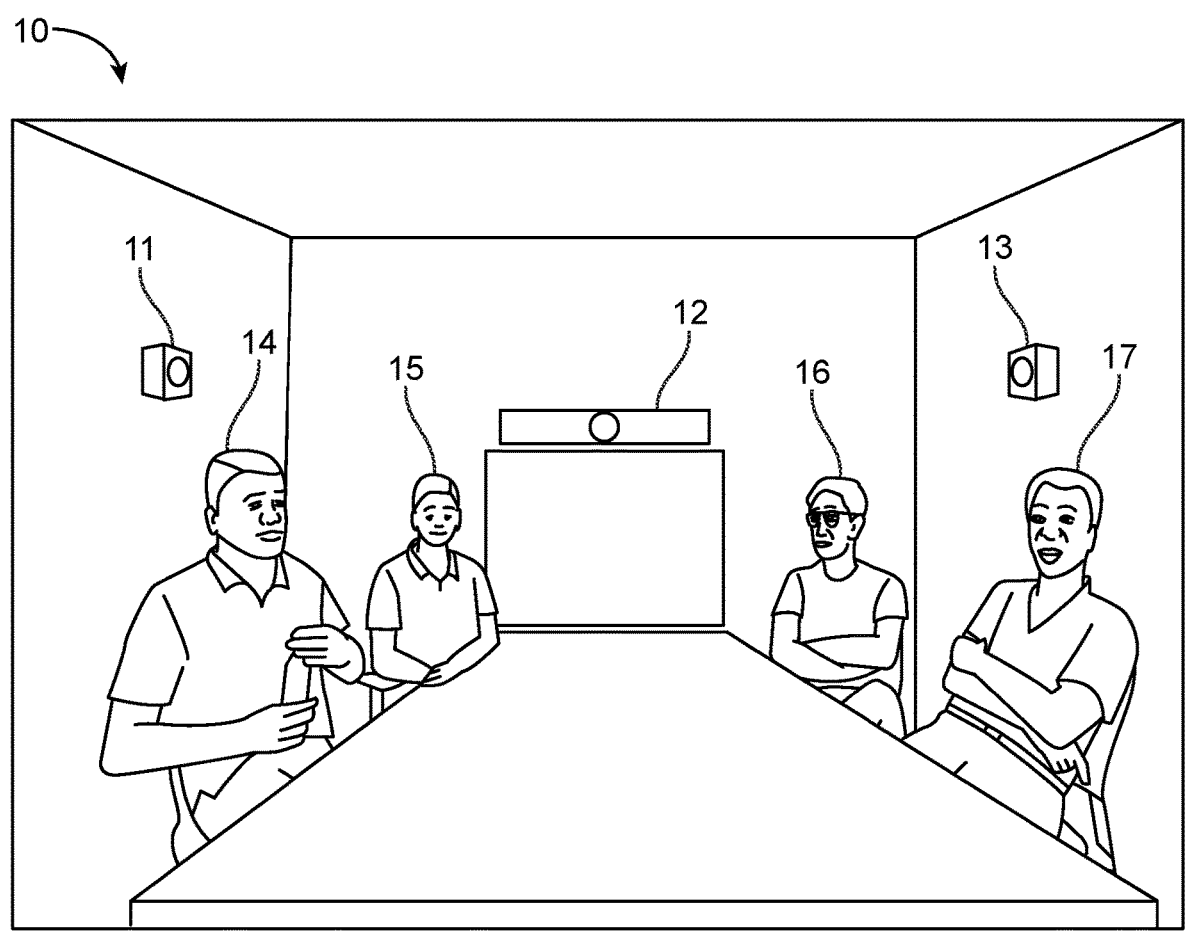
FIG. 1 illustrates a multi-camera video conference room having multiple participants seated within the camera fields of view in accordance with selected embodiments of the present disclosure.

A system, apparatus, methodology, and computer program product are described for correctly determining the total number of unique participants in the multi-camera meeting room by evaluating multiple camera images of the meeting room participants to identify participant images with unique identifying signatures or embeddings and by applying a person re-identification process which uses the unique identifying signatures or embeddings to match participants appearing in different overlapping camera views and to de-duplicate the participant images.

Various illustrative embodiments of the present invention will now be described in detail with reference to the accompanying figures. In the drawings and the description of the drawings herein, certain terminology is used for convenience only and is not to be taken as limiting the examples of the present disclosure. In the drawings and the description below, like numerals indicate like elements throughout. Throughout this disclosure, terms are used in a manner consistent with their use by those of skill in the art. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified block diagrams and schematic circuit block diagrams without including every circuit element or detail in order to avoid limiting or obscuring the present invention. Such descriptions and representations are used by those skilled in the art to describe and convey the substance of their work to others skilled in the art. It is also noted that, throughout this detailed description, certain elements in the figures are illustrated for simplicity and clarity and have not necessarily been drawn to illustrate specific details. Furthermore, the described features, advantages, and characteristics of the invention may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments. For example, selected aspects are depicted with reference to simplified circuit schematic drawings without including every circuit detail in order to avoid limiting or obscuring the present invention. Such details are well known and not considered necessary to teach one skilled in the art of how to make or use the present invention.

By way of background information, large conference meeting rooms increasingly require multiple cameras for best coverage of everyone in the room, where the positioning of the cameras and their respective fields of view should ensure that the video calling system sends the best view of each person in the room. To illustrate an example multi-camera conference room arrangement, reference is now made to FIG. 1 which illustrates a multi-camera video conference room 10 having multiple participants 14-17 seated within the camera fields of view of a plurality of cameras 11-12 in accordance with selected embodiments of the present disclosure. In this arrangement, the center camera 12 has a first field of view from the back of the room which captures side or profile views of all four participants 14-17 sitting at the table. In addition, a camera 11 on the left of the room has a second field of view which captures the "back" views of participants 14-15 and the "front" views of participants 16-17. Likewise, a camera 13 on the right of the room has a third field of view which captures the "back" views of participants 16-17 and the "front" views of participants 14-15. As a result, there are up to four different participant images captured by each of the three cameras 11-13, resulting in a total of up to twelve different participant images which must be sorted and reconciled when coordinating the multiple image streams from the multiple cameras into a single gallery view of the conference meeting. To this end, a centralized codec which is responsible for maintaining the conference video call should process and encode the image streams from the different cameras to select and display the best view of everyone from each camera without any duplication caused by overlapping camera field of views. This codec processing requires that individual meeting participants captured in the multiple camera images be detected and uniquely identified, that the best view for each meeting participant be selected, and that the identified meeting participants be processed for deduplication to determine and report an accurate count of the meeting participants in the room.

In the example multi-camera video conference room 10, the center camera 12 may include the codec that is responsible for maintaining the video call, and may therefore be considered the "primary" camera. The side camera 11, 13 may be considered "secondary" cameras since they each feed the streams to the primary camera which then encodes the received streams for display in a single gallery view of the conference meeting to remote conference endpoint participants. In other embodiments, the codec function may be isolated from the cameras 11-13 in which case all the cameras 11-13 send their feed to the centralized codec responsible for maintaining the call. As described more fully hereinbelow, each of the cameras 11-13 may include a machine learning model that is trained and run to realize the computational functions described hereinbelow, though in other embodiments, the machine learning model may be offloaded to a centralized codec or other computational device, such as an information handling system. In such embodiments, each of the cameras 11-13 may communicate with one another or with the centralized codec via any suitable wired or wireless communication channel.

As will be appreciated, other multi-camera arrangements can be used to conduct a video conference call in a meeting, so the arrangements of participant and camera locations can vary from what is depicted in FIG. 1. The relevant point is that the conference room is covered by multiple cameras, so there are challenges with consolidating and processing all of the camera image streams to generate a single gallery view of the conference meeting that does not have duplicated people and that has the best view of everyone in the room.

Figure 2:
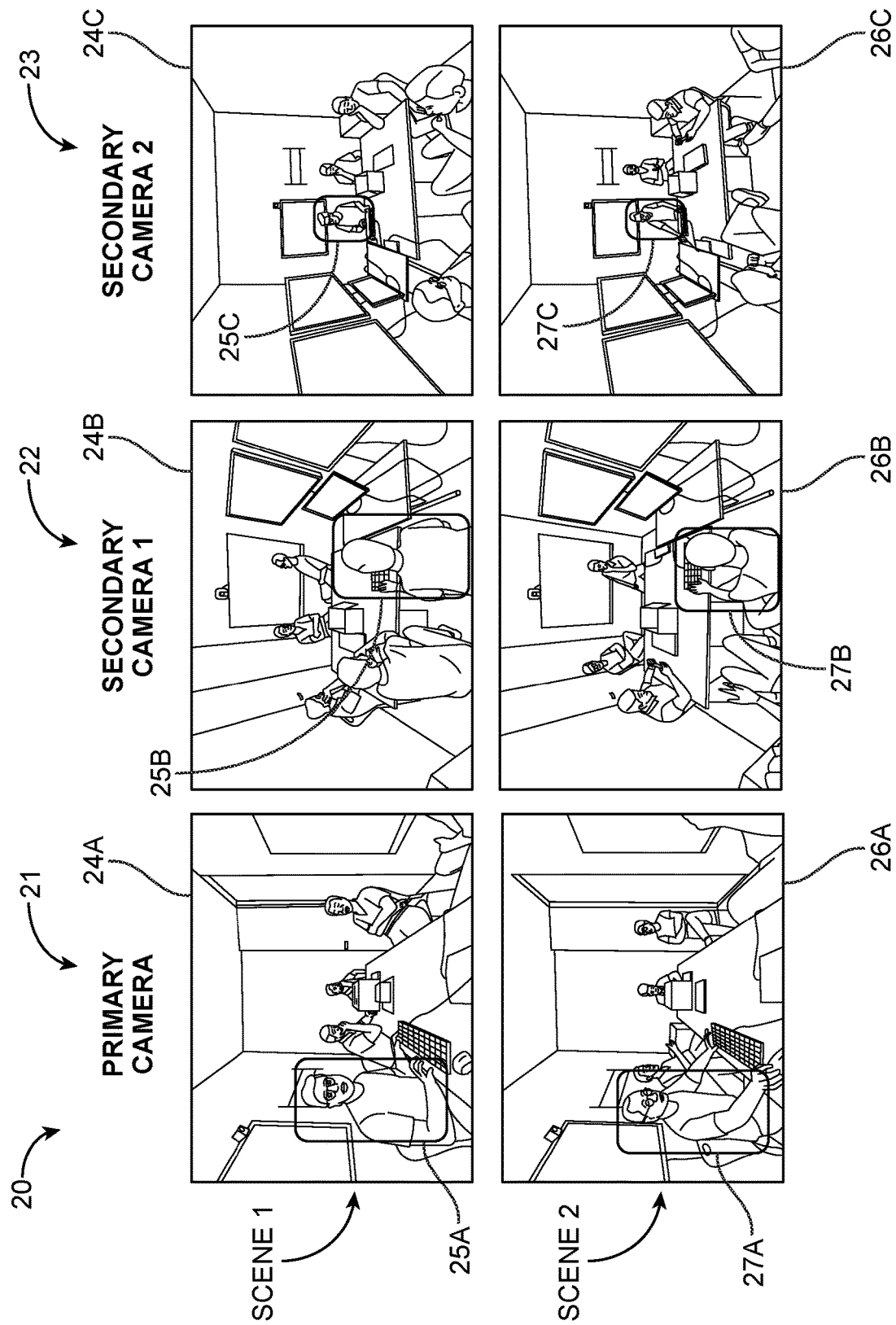
FIG. 2 depicts two different scenes of a multi-camera video conference room having multiple participants seated within different camera fields of view, where each scene is captured by a plurality of different cameras in accordance with selected embodiments of the present disclosure.

To illustrate the challenges posed with processing multiple camera image streams, reference is now made to FIG. 2 which is a depiction 20 of two different scenes 24, 26 of a multi-camera video conference room having multiple participants seated within different camera fields of view, where each scene is captured by a plurality of different cameras 21-22. In particular, the first scene (Scene 1) is captured with the upper images 24A-C which include a first perspective image 24A from a primary camera 21 (located at an end of the conference room table), a second perspective image 24B from a first secondary camera 22 (located on one side of the conference room table), and a third perspective image 24C from a second secondary camera 23 (located on the other side of the conference room table). Since the three perspective images 24A-C provide overlapping fields of view, each meeting participant is seen in all three perspective images 24A-C, resulting in image "duplication" for a single meeting participant in the image. By way of example, multiple different images of a first participant 25 are captured from different perspectives, including a frontal image in the first perspective image 24A (as indicated by the body bounding box 25A), a back of the head image in the second perspective image 24B (as indicated by the body bounding box 25B), and a side profile image in the third perspective image 24C (as indicated by the body bounding box 25C).

In similar fashion, the second scene (Scene 2) is captured with the lower images 26A-C which include a first perspective image 26A from a primary camera 21 (located at an end of the conference room table), a second perspective image 26B from a first secondary camera 22 (located on one side of the conference room table), and a third perspective image 26C from a second secondary camera 23 (located on the other side of the conference room table). Again, the three perspective images 26A-C provide overlapping fields of view so that there is image "duplication" for individual meeting participants in all three perspective images 26A-C. For example, there are multiple different images of a first participant 27 captured from different perspectives, including a side profile image in the first perspective image 26A (as indicated by the body bounding box 27A), a back of the head image in the second perspective image 26B (as indicated by the body bounding box 27B), and a frontal profile image in the third perspective image 26C (as indicated by the body bounding box 27C). In these examples, it can be seen that only one or two of the cameras get the frontal shot of every meeting participant, and one of the cameras always gets a "back of the head" shot of the meeting participant.

With multiple or "duplicate" participant images being captured by the multi-camera system, the total number of unique meeting participants must be determined so that any gallery view of the conference meeting does not include duplicated people and that has the best view of everyone in the room. To this end, there is disclosed herein a system, apparatus, methodology, and computer program product for evaluating multiple camera images of the meeting room participants to identify participant images, generating or extracting unique identifying signatures or embeddings for each meeting participant, and applying a person re-identification process which uses the unique identifying signatures or embeddings to match participants appearing in different overlapping camera views.

As a preliminary step in the disclosed system, apparatus, methodology, and computer program product, each camera image captured from a conference meeting room scene is processed to extract body or person bounding boxes corresponding to each meeting participant. While any suitable body bounding box extraction process may be used, selected embodiments of the present disclosure may implement a process which starts by detecting head bounding boxes from a camera image, and then processing each head bounding box to extract a corresponding body bounding box, such as by extending the head bounding box by predetermined pixel distances in both vertical and horizontal directions.

Figure 3:
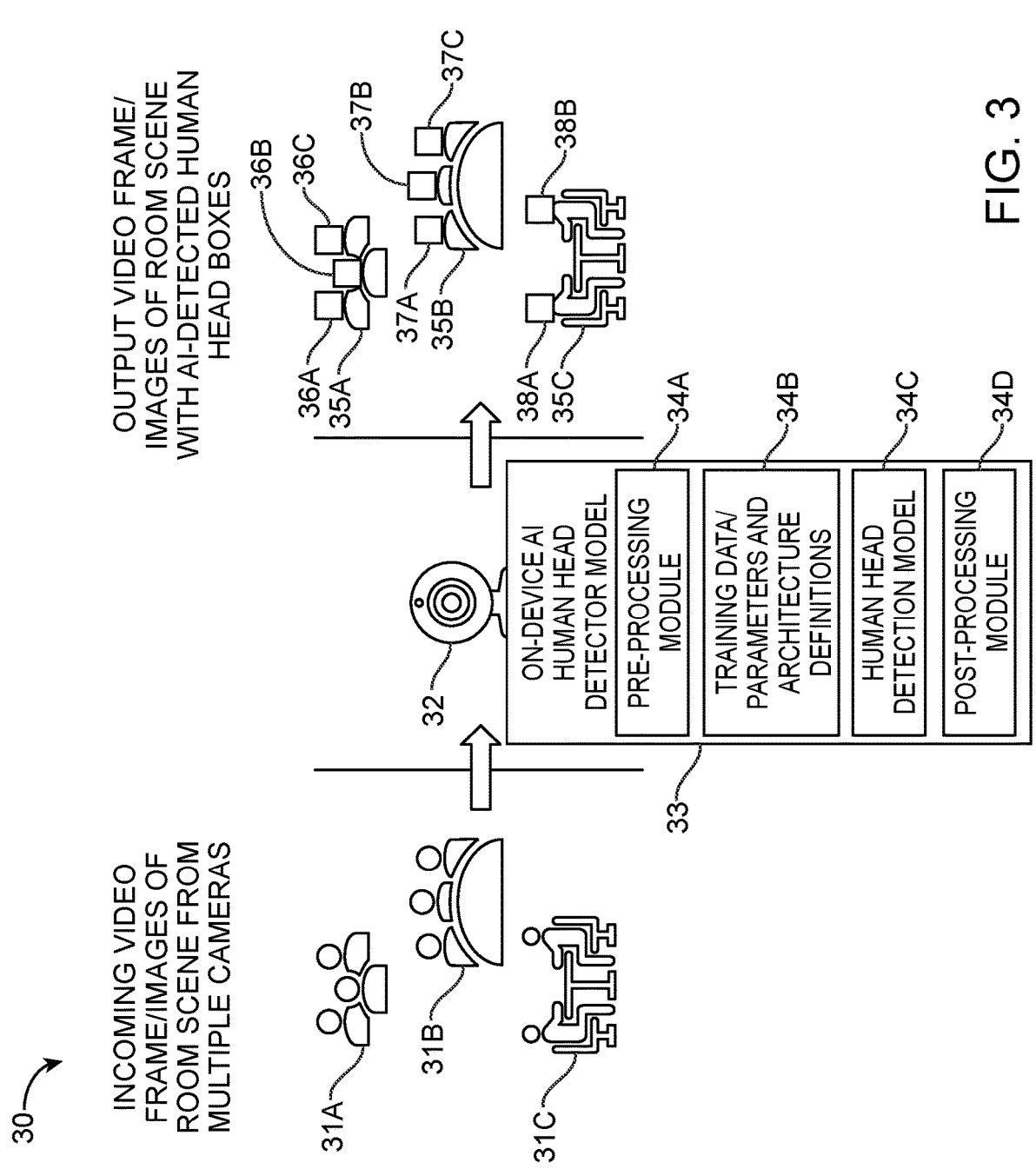
FIG. 3 depicts a simplified flow diagram of a human head detector system which processes incoming room-view video frame images of a meeting room scene to detect human heads and to identify corresponding head bounding boxes in accordance with selected embodiments of the present disclosure.

To provide additional details for an improved understanding of selected embodiments of the present disclosure, reference is now made to FIG. 3 which depicts a simplified flow diagram of a human head detector system 30 which processes incoming room-view video frame images 31 of a meeting room scene with a head detector machine learning model 33 to detect and display human heads with corresponding head bounding boxes 36-38. As depicted, the incoming room-view video frame images 31 may be captured by different cameras in a multi-camera video conferencing system, where overlapping views of the meeting participants are captured by a first camera in a first profile image 31A, by a second camera in a second profile image 31B, and by a third camera in a third profile image 31C. In this example, each of the incoming room-view video frame images 31A-C may be processed with an on-device artificial intelligence (AI) human head detector model 33 that may be located at the respective camera 32 which captures the video frame images. However, in other embodiments, the AI human head detector model 33 may be located at a remote or centralized location. Wherever located, the AI human head detector model 33 may be configured with a plurality of processing modules 34 which implement a machine learning model which is trained to detect or classify human heads from the incoming video frame images, and to identify, for each detected human head, a head bounding box with specified image plane coordinate and dimension information.

In the depicted example embodiment, the AI human head detector model 33 may include a first pre-processing module 34A that is configured to apply image pre-processing (such as color conversion, image scaling, image enhancement, image resizing, etc.) so that the input video frame image is prepared for subsequent AI processing. In addition, a second module 34B may be configured with training data parameters or model architecture definitions which may be pre-defined and used to train and define the human head detection model 34C to accurately detect or classify human heads from the incoming video frame images. In selected embodiments, the human head detection model 34C may be implemented as a model inference software or machine learning model, such as a Convolutional Neural Network (CNN) model that is specially trained for video codec operations to detect heads in an input image by generating pixel-wise locations for each detected head and by generating, for each detected head, a corresponding head bounding box which frames the detected head. Finally, the AI human head detector model 33 may include a post-processing module 34D which is configured to apply image post-processing to the output from the AI human head detector model 33 to make the processed images suitable for human viewing and understanding. In addition, the post-processing module 34D may also reduce the size of the data outputs generated by the human head detection model 34C, such as by consolidating or grouping a plurality of head bounding boxes or frames which are generated from a single meeting participant so that only a single head bounding box or frame is specified.

Based on the results of the processing modules 34, the AI human head detector model 33 may generate output video frame images 35 in which the detected human heads are framed with corresponding head bounding boxes 36-38. As depicted, the first output video frame image 35A includes head bounding boxes 36A-C which are superimposed around each detected human head. In addition, the second output video frame image 35B includes head bounding boxes 37A-C which are superimposed around each detected human head, and the third output video frame image 35C includes head bounding boxes 38A-B which are superimposed around each detected human head. As will be appreciated, the AI human head detector model 33 may be configured to specify each head bounding box using any suitable pixel-based parameters, such as defining the x and y pixel coordinates of a head bounding box or frame in combination with the height and width dimensions of the head bounding box or frame. In addition, the AI human head detector model 33 may be configured to specify a distance measure between the camera location and the location of the detected human head using any suitable measurement technique. Though not shown, it will be appreciated that the AI human head detector model 33 may also compute, for each head bounding box, a corresponding confidence measure or score which quantifies the model's confidence that a human head is detected.

In selected embodiments of the present disclosure, the AI human head detector model 33 may specify all head detections in the data structure that holds the coordinates of each detected human head along with their detection confidence. In addition, the AI human head detector model 33 may process each detected head through a head orientation classifier which is configured to classify each head into one of the three orientations: 0-Frontal, 1-Right or Left profile, and 2-Back of the head. For example, the Frontal orientation may be defined when the head orientation classifier determines that both of the eyes of the meeting participant are visible in the camera field of view. In addition, the Right or Left profile orientation may be defined when the head orientation classifier determines that only one of the eyes of the meeting participant is visible in the camera field of view. Finally, the Back of the head orientation may be defined when the head orientation classifier determines that none of the eyes of the meeting participant is visible in the camera field of view.

In the above embodiments, the human head data structure for n human heads may be generated as follows:

$$\left\{ \begin{array}{l} x_1 y_1 \text{ Width}_1 \text{ Height}_1 \text{ Score}_1 \ d_1 \text{ Frontal} \\ x_2 y_2 \text{ Width}_2 \text{ Height}_2 \text{ Score}_2 \ d_2 \text{ Profile} \\ \vdots \\ x_n y_n \text{ Width}_n \text{ Height}_n \text{ Score}_n \ d_n \text{ BackOfHead} \end{array} \right\}$$

where $x_i$ and $y_i$ refer to the image plane coordinates of the $i^{th}$ detected head, and where $\text{Width}_i$ and $\text{Height}_i$ refer to the width and height information for the head bounding box of the $i^{th}$ detected head. In addition, Score, is in the range (0, 100] and reflect confidence in % for the $i^{th}$ detected head, and $d_i$ is distance in meters for the $i^{th}$ detected head. This data structure may be used as an input to various applications, such as framing, tracking, composing, recording, switching, reporting, encoding, etc. In this example data structure, the first detected head has a frontal orientation that is in the image frame in a head bounding box located at pixel location parameters $x_1$, $y_1$ and extending laterally by $\text{Width}_1$ and vertically down by $\text{Height}_1$. In addition, the second detected head has a profile orientation that is in the image frame in a head bounding box located at pixel location parameters $x_2$, $y_2$ and extending laterally by Width 2 and vertically down by $\text{Height}_2$, and the $n^{th}$ detected head has a BackOfHead orientation that is located in the image frame in a head bounding box located at pixel location parameters $x_n$, $y_n$, and extending laterally by $\text{Width}_n$ and vertically down by $\text{Height}_n$.

After identifying the head bounding boxes, the disclosed system, apparatus, methodology, and computer program product may then extract person bounding boxes from the identified head bounding boxes using any suitable approach, such as by extending the head bounding box by predetermined pixel distances in both vertical and horizontal directions. The result of the body bounding box extraction process is that the head bounding box is enlarged or increased to capture adjacent parts of the input video frame image where the meeting participant's body, or at least the upper portion of the body, is located in the image. To provide an example implementation, the body bounding box may be extracted from the head bounding box by first determining the height H and width W parameters of the head bounding box, and then using these parameters to compute an extension of the head bounding box which defines the body bounding box. For example, the body bounding box may be computed to extend laterally on each side of the body bounding box by a predetermined or proportional distance (e.g., W/2). In addition, the body bounding box may be computed to extend vertically below the body bounding box by a predetermined or proportional distance (e.g., 2H). Finally, the body bounding box may be computed to extend vertically above the body bounding box by a predetermined distance or pixel count (e.g., 7 pixels).

Figure 4:
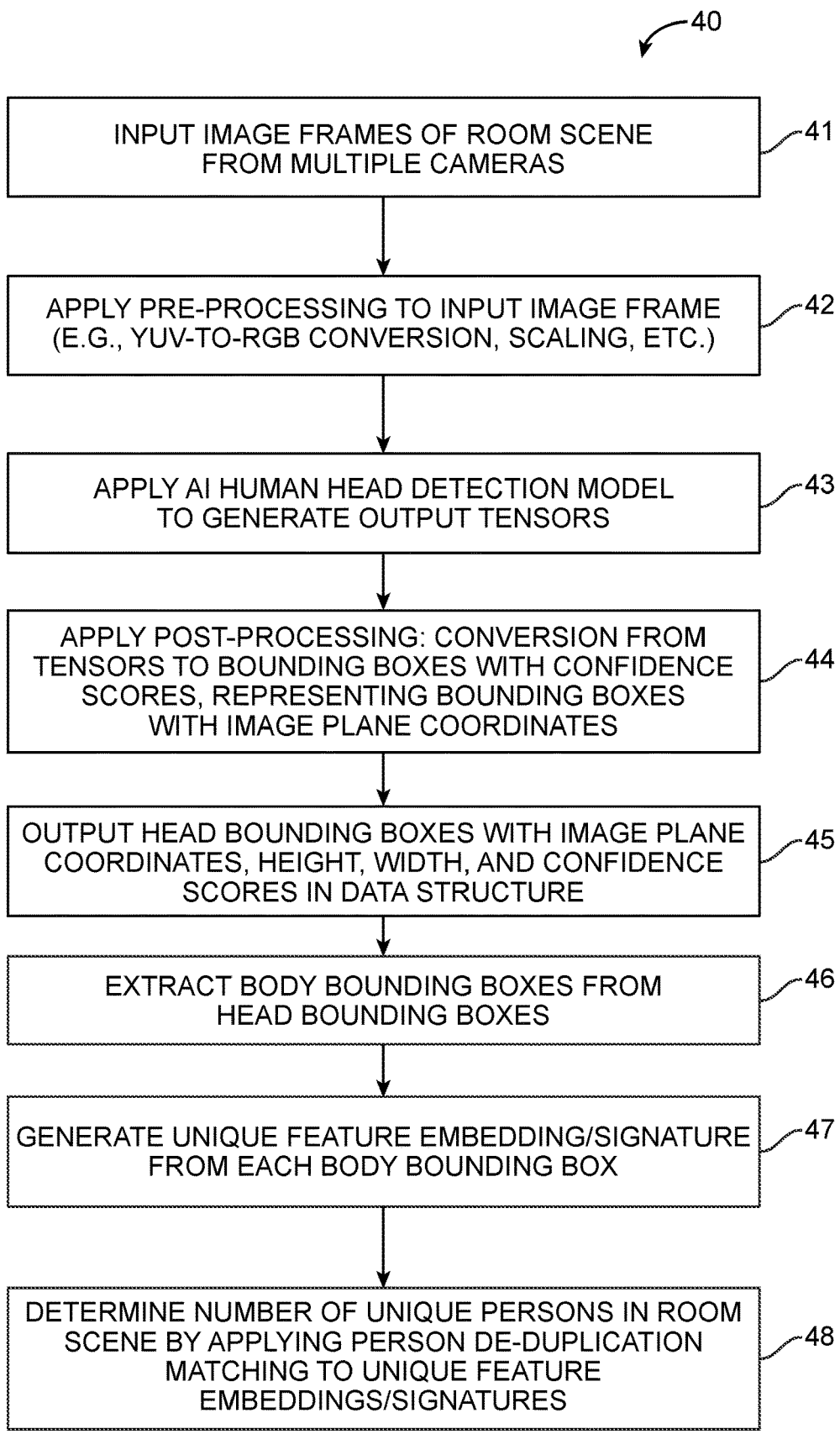
FIG. 4 is a flowchart showing the control logic for using feature embedding values extracted from body bounding boxes to determine the total number of unique participants in multi-camera meeting room in accordance with selected embodiments of the present disclosure.

To provide additional details for an improved understanding of selected embodiments of the present disclosure, reference is now made to FIG. 4 which depicts a flowchart 40 showing the control logic for using feature embedding values extracted from body bounding boxes to determine the total number of unique participants in multi-camera meeting room. The order in which the control logic steps are described is not intended to be construed as a limitation, and any number of the described method steps may be combined in any order to implement the control logic and method steps.

At step 41, the method starts when a video/web conference call meeting is started in a conference room or area in which a multi-camera video conference system is located to run the video/web conference call meeting and image frames of the room scene are input or captured by multiple cameras in the room. At step 42, image pre-processing is applied to the input image frame. Examples of such image pre-processing include, but are not limited to, color conversion between YUV and RGB color spaces, image scaling, image resizing, and the like.

At step 43, an artificial intelligence head detection model is applied to generate output tensors which identify one or more human heads in the input image frame. In selected embodiments, the head detection model may be run as a machine learning model. As disclosed herein, convolutional neural networks—also known as artificial neural networks (ANNs) or simulated neural networks (SNNs)—are a subset of machine learning which may be used by a video codec to detect heads in an input image and to generate output tensors that identify human heads from the input image frame.

A convolutional neural network is a class of deep neural network which can be applied analyzing audio voice data. A deep neural network is an artificial neural network with multiple layers between the input and output layers. Artificial neural networks are computing systems inspired by the biological neural networks that constitute animal brains. Artificial neural networks exist as code being executed on one or more processors. An artificial neural network is based on a collection of connected units or nodes called artificial neurons, which mimic the neurons in a biological brain. Each connection, like the synapses in a biological brain, can transmit a 'signal' to other neurons. An artificial neuron that receives a signal then processes it and can signal neurons connected to it. The signal at a connection is a real number, and the output of each neuron is computed by some non-linear function of the sum of its inputs. The connections are called edges. Neurons and edges have weights, the value of which is adjusted as 'learning' proceeds and/or as new data is received by a state system. The weight increases or decreases the strength of the signal at a connection. Neurons may have a threshold such that a signal is sent only if the aggregate signal crosses that threshold.

At step 44, image post-processing is applied to the results output from the head detection model. Examples of such image post-processing include, but are not limited to, converting the tensors to head bounding boxes with confidence scores, representing head bounding boxes with image plane coordinates, filtering or removing any tensors which correspond to human head profiles that are not frontal views (e.g., discarding side profile and/or back of head views).

At step 45, the identified head bounding boxes are output for additional processing. In selected embodiments, each camera outputs the head bounding boxes by generating a head bounding box data structure that includes image plane coordinates, height and width dimension parameters, associated confidence scores for each human head detected in the input image frame. Though not shown, it will be appreciated that the head bounding box data structure may include information which classifies each detected head as a frontal, profile, or Back of the head image.

At step 46, body bounding boxes are extracted from the identified head bounding boxes. Generally, the extraction of body bounding boxes may employ any desired technique for extending the head bounding box by predetermined distances or measures in both vertical and horizontal directions to capture adjacent parts of the input image frame where the meeting participant's body, or at least the upper portion of the body, is located.

At step 47, a unique feature embedding, or signature is generated or extracted from each defined body bounding box. As disclosed herein, any suitable feature embedding technique may be used to compute the unique feature embedding or signature values, such as the Omni-Scale Network (OSNet) feature learning tool for creating a feature embedding which can be used with a person re-identification task of associating images of the same person taken from different camera perspectives. The OSNet tool computes 512-dimensional feature embeddings for each body bounding box extracted from the input image frame. As seen from the foregoing, by computing the body bounding boxes as an extension of a head bounding box in vertical and horizontal directions, additional image information for each meeting participant (e.g., clothing features or color, body poses or gestures, body type, etc.) can be captured and processed to generate unique feature embedding or signature embeddings. In this way, each unique feature embedding or signature value is extracted as a unique identification vector from each body bounding box that captures a frontal view of a meeting participant. The computed 512-dimensional feature embeddings provide an efficient representation of the image information contained in the body bounding box (which might require 100,000 pixel data if represented in image format), thereby saving significant computational resources that are required to evaluate the image information contained in the body bounding box.

At step 48, the unique feature embeddings/signatures are processed with a person matching and/or de-duplication matching process to determine the number of unique persons in the conference room or area where the multi-camera video conference system is being used to conduct the video/web conference call. As disclosed herein, any suitable approach may be used to compute the number of unique persons. For example, the embeddings computed from frontal views captured by one of the cameras (e.g., the Primary camera) may be used as Query embeddings to compare against embeddings computed from frontal views from rest of the cameras (e.g., the Secondary camera(s)) are used Gallery embeddings. Through the embedding comparison process, the top matches are found, and identifications are assigned to perform person de-duplication matching. Any suitable embedding matching technique may be used to find the top matches, including but not limited to, computing Euclidean distance or Cosine distance measures between compared embeddings. In other embodiments, the embedding matching technique may construct a kD tree to perform nearest neighbor matching between embedding values. The ability to correctly determine the correct number of unique persons in a meeting room is important to enable the code which controls the video conference call to correctly coordinate the multiple image streams from the multiple cameras into a single gallery view of the conference meeting.

Figure 5:
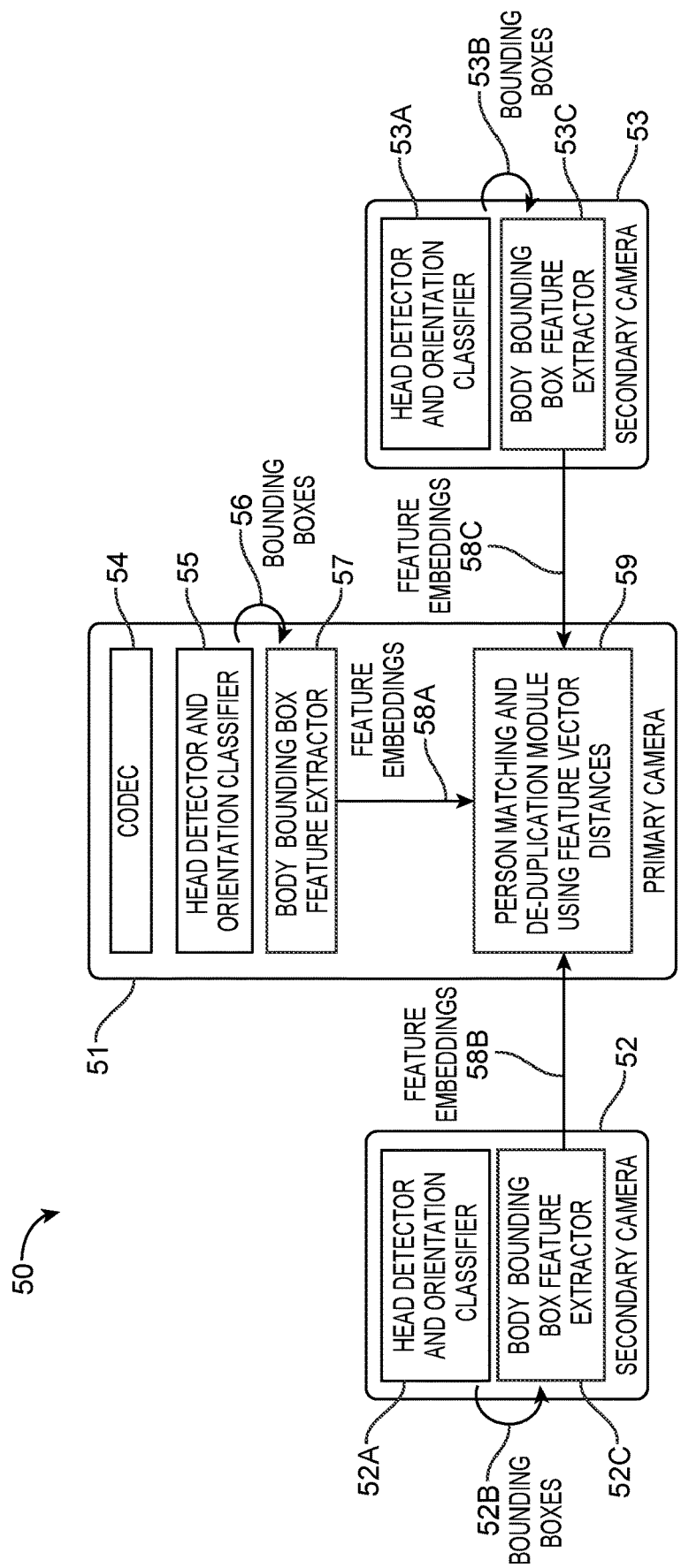
FIG. 5 which depicts a simplified data flow block diagram for a multi-camera video conferencing system which uses feature embedding values to determine the total number of unique participants in multi-camera meeting room in accordance with selected embodiments of the present disclosure.

To provide additional details for an improved understanding of selected embodiments of the present disclosure, reference is now made to FIG. 5 which depicts a simplified data flow block diagram 50 for a multi-camera video conferencing system which uses unique participant ID values to determine the total number of unique participants in multi-camera meeting room. As depicted, there are three smart cameras connected to form the multi-camera video conferencing system, including a primary camera 51 and two secondary cameras 52, 53 which are positioned and arranged with overlapping fields of view of the meeting room. To coordinate and process the audio/video streams received from the cameras 52, 53, the primary camera 51 includes a video codec 54 which is configured to produce and display a single gallery view of the conference meeting to any connected conference endpoints. In the depicted data flow, the three cameras 51-53 are connected to capture and process video input frames. In addition, each camera 51-53 provides one or more feature embeddings 58A-C to the person matching and de-duplication module 59 which uses feature vector distances to match and de-duplicate the feature embeddings 58 which identify the same meeting participant in the meeting room.

In particular, the primary camera includes audio, video and control modules (not shown), and also includes a head detector and orientation classifier 55 which generates bounding boxes 56 for each meeting participant detected in a video input frame captured by the primary camera 51. In similar fashion, the secondary cameras also include audio, video and control modules (not shown), along with a head detector and orientation classifier 52A, 53A, each generating bounding boxes 52B, 53B for each meeting participant detected in a video input frame captured by said secondary camera 52, 53. In selected embodiments, each of the head detector and orientation classifiers 55, 52A, 53A may apply a machine learning model to detect human heads of any meeting participant having a "front" view captured in the video input frame for the corresponding camera.

To process the bounding boxes 56, 52B, 53B, each camera also includes a body bounding box feature extractor module 57, 52C, 53C which is configured to generate and assign feature embeddings which uniquely identify each participant detected in the video input frames captured by the cameras 51-53. To this end, each body bounding box feature extractor module 57, 52C, 53C may be configured to process each received head bounding box 56, 52B, 53B by extracting a corresponding body bounding box, such as by extending the head bounding box by predetermined pixel distances in both vertical and horizontal directions. Each body bounding box feature extractor module 57, 52C, 53C may also be configured to compute a feature embedding value from the image region of interest contained in the body bounding box, so that each participant detected within the body bounding box of the input camera video frame has a unique feature embedding value. Upon receiving the unique feature embedding values for detected body bounding boxes, the person matching and de-duplication module 59 processes the unique feature embedding values collected from different cameras 51-53 to identify and eliminate duplicate camera images for each meeting participant. In selected embodiments, the person matching and de-duplication module 59 matches "query" feature embeddings generated by the primary camera 51 against "gallery" feature embeddings generated by each secondary camera to identify and de-duplicate the top or closest matches, such as by computing Euclidean distance or cosine distance measures to find and assign feature embeddings to the same meeting participant, thereby "de-duplicating" the duplicate camera images for each meeting participant so that an accurate count of the participants in the room can be determined.

Figure 6:
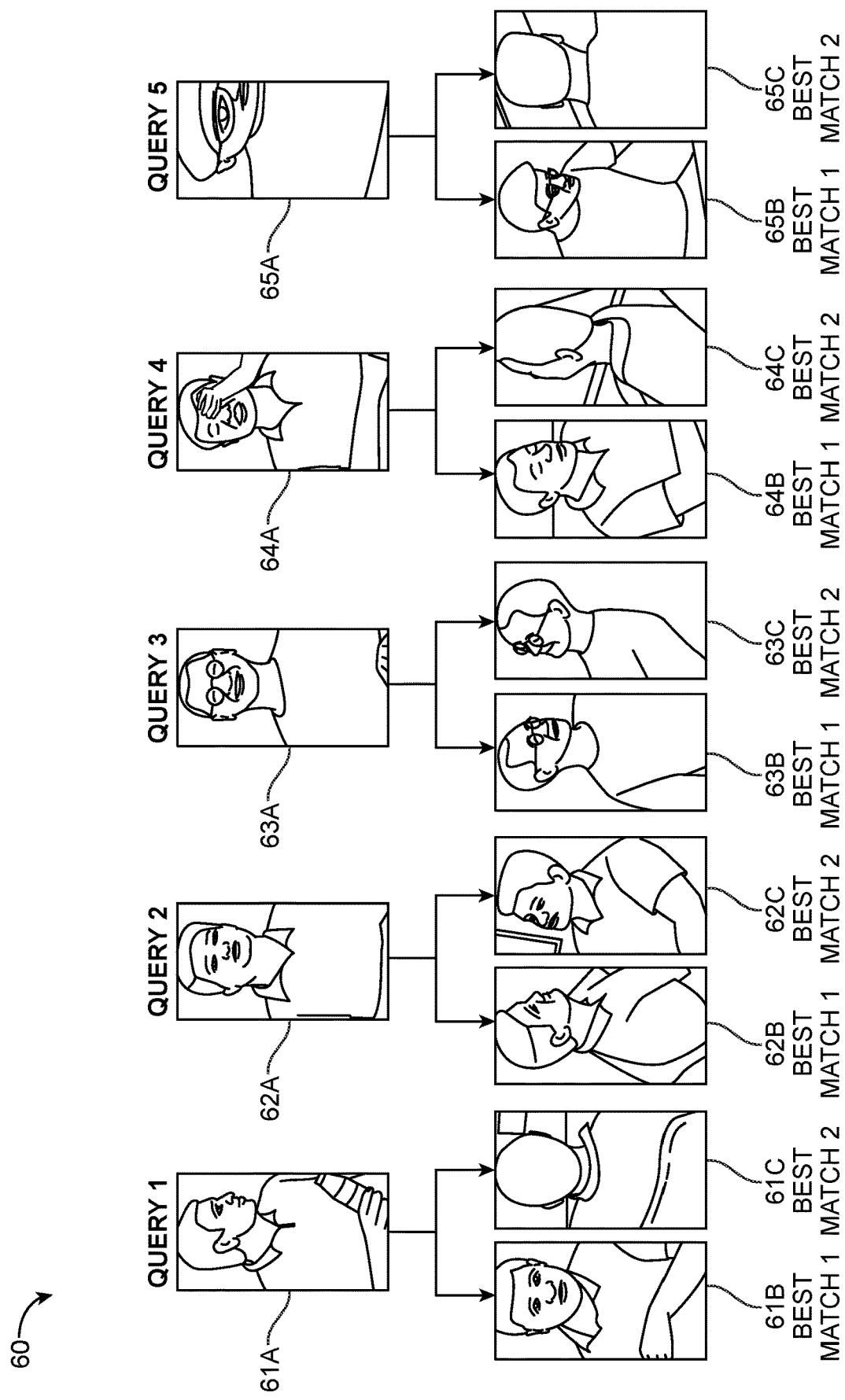
FIG. 6 is diagrammatic depiction of a matching process which uses feature embedding values to compare query images against gallery images to de-duplicate and match images of each meeting participant in accordance with selected embodiments of the present disclosure.

To provide additional details for an improved understanding of selected embodiments of the present disclosure, reference is now made to FIG. 6 which diagrammatically depicts a matching process which uses feature embedding values to compare query images 61A, 62A, 63A, 64A, 65A against gallery images to de-duplicate and match images of each meeting participant. The query-based image matching process enables the multi-camera video conference system to identify images of the same meeting participant collected from the multiple camera field-of-views (FOVs) so that the actual number of unique meeting participants in the meeting room can be determined. In this example, the query images 61A, 62A, 63A, 64A, 65A may be selected from the input video frames captured by the primary camera, and the remaining images may be captured from the secondary camera(s) so that, when compared to the query images, corresponding "best match" images are identified. For example, the first query image 61A of a first meeting participant captured by the primary camera is compared to the gallery images to identify the top two matching images 61B, 61C for the first participant which may be removed from the gallery images. Next, the second query image 62A of a second meeting participant captured by the primary camera is compared to the gallery images to identify the top two matching images 62B, 62C for the second participant, and so on for the remaining query images 63A, 64A, 65A. As a result, the total number of meeting participants (e.g., 5) can be determined upon completion of the person matching and de-duplication process.

While computer-based person re-identification (re-ID) techniques can be used to track a specific person across multiple camera FOVs using the query-gallery image matching process, significant computation resources are required to process image data. Accordingly, selected embodiments of the present disclosure provide a computationally efficient image matching process whereby the input video frames from each camera are processed to identify meeting participants that are contained within a body bounding box and then further processed to extract feature embedding values from each body bounding box. Once feature embedding values are extracted for each meeting participant image captured by the multiple camera FOVs, the meeting participant images (and their corresponding feature embedding values) are divided into a "Query" set and a "Gallery" set which are used as a validation dataset for the re-ID process. In particular, for each query sample (e.g., 61A), the re-ID process is applied to find correspondences with the large gallery set, such that all images for the unique query person can be identified. However, rather than using image data to perform the query processing, the feature embedding values are used to compare query images more efficiently against gallery images to de-duplicate and match images of each meeting participant.

Figure 7:
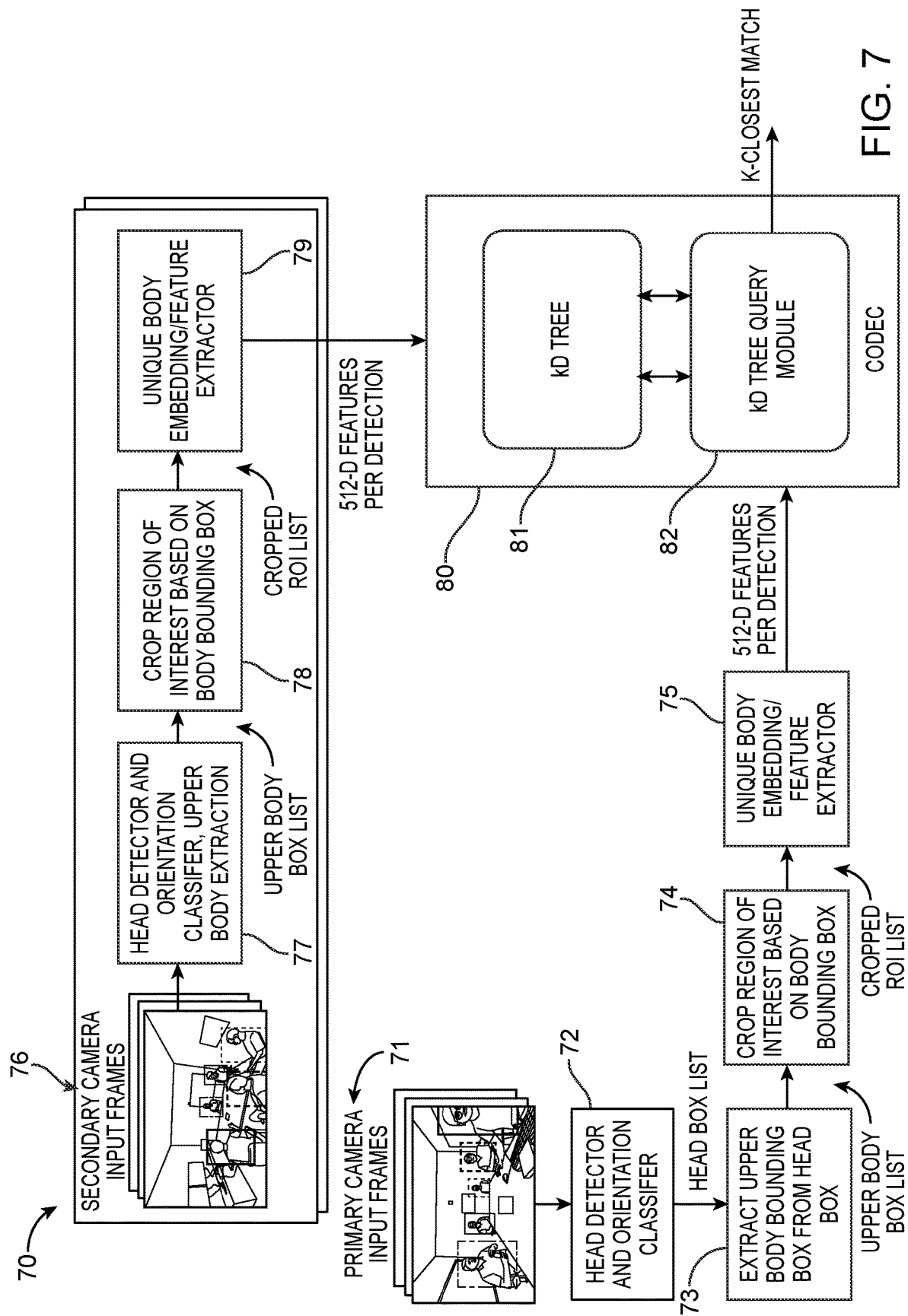
FIG. 7 is simplified computational flow diagram for a multi-camera video conference system which is configured to determine the total number of unique participants in a multi-camera meeting room in accordance with selected embodiments of the present disclosure.

To provide additional details for an improved understanding of selected embodiments of the present disclosure, reference is now made to FIG. 7 which shows a simplified computational flow diagram 70 for a multi-camera video conference system which is configured to determine the total number of unique participants in a multi-camera meeting room. In the depicted computational flow, the primary camera captures input frame images 71 of the meeting room scene wherein participants are seated around a table. Each frame image 71 is processed by the head detector and orientation classifier 72 which generates a list of head bounding boxes which may be formatted with the human head data structure described hereinabove. Though not required, it will be appreciated that additional image processing may be performed at each camera front end to classify the orientation of each detected head, such as by running a pose model which may embed the head box list with information classifying each head in terms of a Frontal, Profile, or Back of Head orientation. The list of head bounding boxes is then processed by the body bounding box extraction module 73 to extract an upper body bounding box from each identified head bounding box, thereby generating an upper body bounding box list. To illustrate an example set of body bounding boxes, each meeting participant in the input frame 71 is illustrated with a corresponding body bounding box. Next, the frame image may be processed by the image cropping module 74 to crop the region of interest (ROI) corresponding to the body bounding box in which the meeting participant is captured, thereby generating a cropped ROI list. Each region of interest is then processed by a feature extractor 75 which is configured to generate unique body embeddings or features. For example, the feature extractor 75 may be embodied as an OSNet tool which computes 512-dimensional feature embeddings for each region of interest corresponding to a body bounding box, thereby identifying the meeting participant captured in the region of interest.

Similar to the computational flow of the primary camera, each secondary camera also captures input frame images 76 which are taken from a different perspective of the meeting room scene wherein the same participants are seated around the table. At the secondary camera(s), each frame image 76 is processed by the head detector and orientation classifier and upper body extraction module 77 which generates a list of head bounding boxes which are then processed to extract an upper body bounding box from each identified head bounding box, thereby generating an upper body bounding box list. To illustrate an example set of body bounding boxes, each meeting participant in the input frame 76 is illustrated with a corresponding body bounding box which has a matching appearance to the body boxes shown in the input frame 71 so that each meeting participant has body boxes with matching appearances. Next, the frame image captured by the secondary camera is processed by the image cropping module 78 to crop the region of interest (ROI) corresponding to the body bounding box in which the meeting participant is captured, thereby generating a cropped ROI list. Each region of interest is then processed by a feature extractor 79 which is configured to generate unique body embeddings or features. Again, the feature extractor 79 may be embodied as an OSNet tool which computes 512-dimensional feature embeddings for each region of interest corresponding to a body bounding box, thereby identifying the meeting participant captured in the region of interest.

With each of the cameras generating unique body embedding features from each detected body bounding box in the form of a 512-dimensional feature embedding, the cameras are connected to convey the body embedding features over a network to a centralized codec 80 instead of conveying the much larger cropped ROI data, thereby reducing network load and improving computational flow efficiency of the multi-camera video conference system. At the centralized codec 80, the unique body embedding features are processed with a person matching and/or de-duplication matching process to determine the number of unique persons in the conference room or area where the multi-camera video conference system is being used to conduct the video/web conference call. While any suitable approach may be used to compute the number of unique persons, selected embodiments of the present disclosure may construct a kD tree 81 to perform nearest neighbor matching between body embedding features. Once the kD tree 81 is constructed, the kD tree query module 82 may be run on the kD tree 81 to use body embedding features computed from the primary camera as Query embeddings to compare against body embedding features computed from secondary camera(s)) as Gallery embeddings to find the k-closest matches for each query embedding. However, any suitable embedding matching technique may be used to find the top matches, including but not limited to, computing Euclidean distance or Cosine distance measures between compared embeddings.

Figure 8:
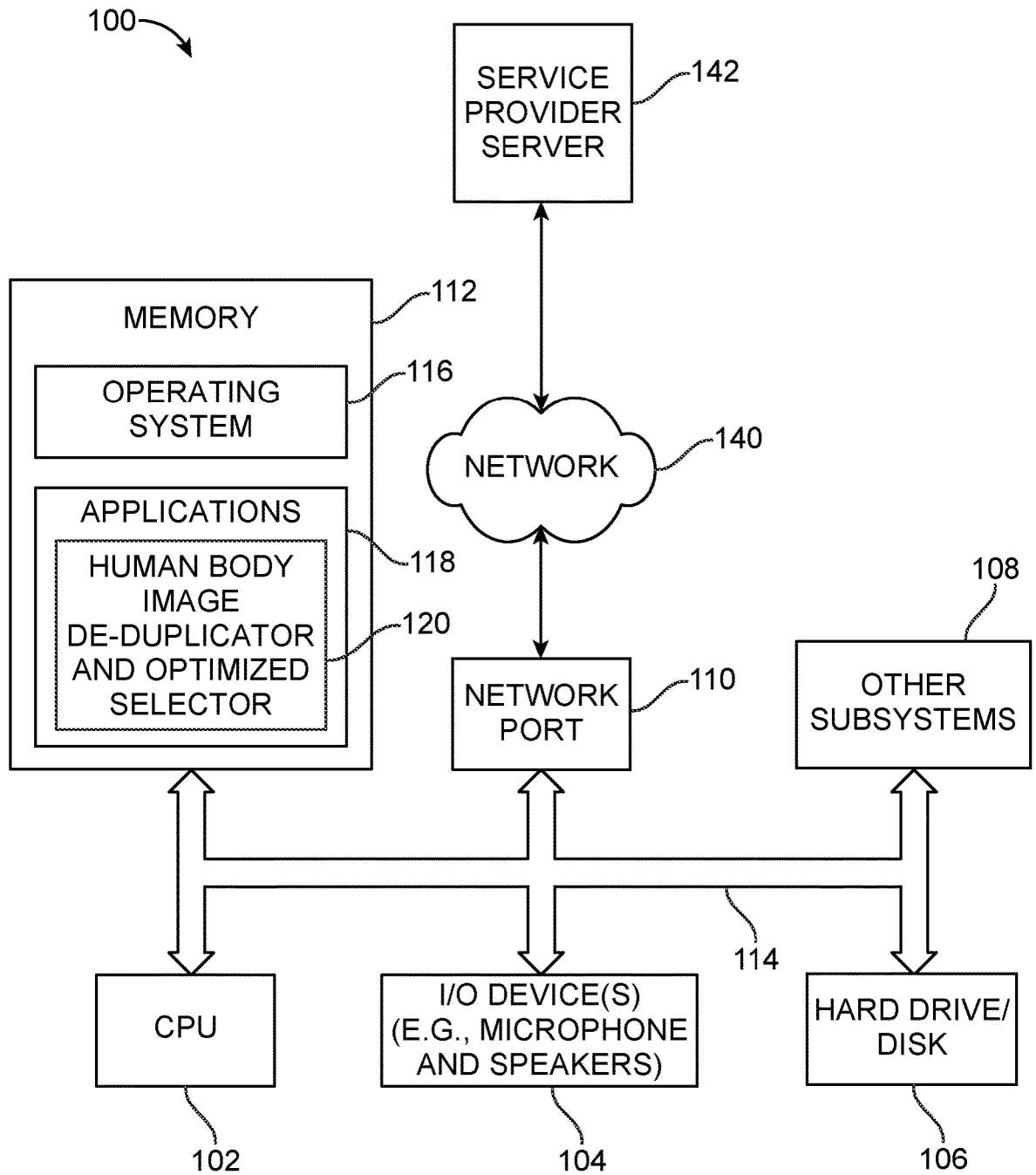
FIG. 8 is a schematic block diagram illustrating components of an information handling system in accordance with embodiments of the present disclosure.

Referring to FIG. 8, there is depicted a schematic block diagram illustrating components of an information handling system 100 that can be used to implement selected embodiments of the present disclosure. In selected embodiments, the information handling system 100 may implement devices such as a notebook or laptop personal computer (PC), a smartphone, or other computing devices, such as the smart camera devices 51-53, video codec 80 as described herein.

As depicted, the information handling system 100 includes a processor (e.g., central processor unit or "CPU") 102, input/output (I/O) devices 104, such as a microphone, a speaker(s), a keyboard, a video/display, a mouse, and associated controllers, a hard drive or disk storage 106, and various other subsystems 108. In addition, the information handling system 100 may include a network port 110 operable to connect to a network 140, where network 140 can include one or more wired and wireless networks, including the Internet. Network 140 is likewise accessible by a service provider server 142. The information handling system 100 may also include system memory 112, which is interconnected to the foregoing via one or more buses 114. System memory 112 can be implemented as hardware, firmware, software, or a combination of such. System memory 112 further includes an operating system (OS) 116. Embodiments provide for the system memory 112 to include applications 118.

In selected embodiments, the system memory 112 may be implemented with flash memory and/or RAM which stores modules of different functionality in the form of software and firmware, generically programs, for controlling the system 100. For example, the memory 112 may include a human body image de-duplicator and optimized selector 120 which may include a machine learning human head detector model, pose model, orientation classifier, and unique body bounding box extraction application or software module for correctly determining the total number of unique participants in multi-camera meeting room by generating and assigning feature embedding or signature values to each participant detected in multi-camera field of view images, and then processing the feature embedding/signature values to identify and eliminate duplicate camera images for each meeting participant.

By now it will be appreciated that there is disclosed herein a computer implemented method, system, and non-transitory processor readable memory containing programs that perform a method for identifying meeting participants in a multi-camera video conference room. In the disclosed methodology, a plurality of input frame images taken from different perspectives of the video conference room are generated by a corresponding plurality of cameras connected together over a communication network. The disclosed methodology also detects, from each input frame image, one or more human heads for any meeting participants captured in the input frame image by applying a machine learning human head detector model to said input image frame. In selected embodiments, the human heads are detected by applying image pre-processing to each input frame image, applying a machine learning human head detector model to each input image frame to generate an output tensor for each detected human head and applying image post-processing to convert each output tensor to a head bounding box which surrounds a corresponding detected human head. In addition, the disclosed methodology generates, from each detected human head, a head bounding box which surrounds the detected human head. The disclosed methodology also extracts from each head bounding box, a body bounding box which surrounds the detected human head and at least an upper body portion of a meeting participant belonging to the detected human head, thereby generating a plurality of body bounding boxes from the plurality of input frame images. In selected embodiments, each body bounding box is extracted by extending the head bounding box by predetermined distances in both vertical and horizontal directions to surround the detected human head and at least the upper body portion of the meeting participant belonging to the detected human head. In addition, the disclosed methodology generates, from each input frame image portion contained within the body bounding box, a participant identification feature embedding which uniquely identifies the meeting participant captured in the body bounding box, thereby generating a plurality of participant identification feature embeddings from the plurality of body bounding boxes. In selected embodiments, each participant identification feature embedding is generated by applying a deep convolutional neural network (CNN) model to generate a multi-dimensional feature embedding for each body bounding box. The disclosed methodology also performs person re-identification processing on the plurality of participant identification feature embeddings to determine a count of the meeting participants in the video conference room. In selected embodiments, person re-identification processing is performed by dividing the plurality of participant identification feature embeddings into a query set and a gallery set, where the query set contains participant identification feature embeddings extracted from body bounding boxes generated from a first input frame captured at a primary camera, and where the gallery set contains participant identification feature embeddings extracted from body bounding boxes generated from one or more additional input frames captured at one or more secondary cameras. As a result, the query set can be compared to the gallery set to identify k top feature embedding matches so that matching feature embeddings are assigned to the same meeting participant. In selected embodiments, the human heads are detected by classifying each detected human head as having a frontal, profile, or back head orientation and discarding any detected human head that is classified as a profile or back head orientation before extracting from each head bounding box, a body bounding box. In selected embodiments, t e plurality of participant identification feature embeddings is generated at the plurality of cameras, and where a central codec performs person re-identification processing on the plurality of participant identification feature embeddings.

In another form, there is disclosed herein a system and methodology for identifying meeting participants in a multi-camera video conference room which includes a plurality of camera input devices connected over a communication network to a video codec device. In the disclosed system and methodology, each camera input device includes a first processor, a first data bus coupled to the first processor, and a non-transitory, computer-readable storage medium embodying computer program code and being coupled to the first data bus, where the computer program code interacts with a plurality of computer operations and includes first instructions executable by the first processor. In particular, the first instructions are configured for generating an input frame image taken from a different perspective of the video conference room. In addition, the first instructions are configured for detecting, from each input frame image, one or more human heads for any meeting participants captured in the input frame image by applying a machine learning human head detector model to said input image frame. In selected embodiments, the first instructions are configured for detecting one or more human heads by classifying each detected human head as having a frontal, profile, or back head orientation and discarding any detected human head that is classified as a profile or back head orientation before extracting, from each head bounding box, a body bounding box. In selected embodiments, the first instructions are configured for detecting one or more human heads by applying image pre-processing to each input frame image; applying a machine learning human head detector model to each input image frame to generate an output tensor for each detected human head; and applying image post-processing to convert each output tensor to a head bounding box which surrounds a corresponding detected human head. In addition, the first instructions are configured for generating, from each detected human head, a head bounding box which surrounds the detected human head. In addition, the first instructions are configured for extracting, from each head bounding box, a body bounding box which surrounds the detected human head and at least an upper body portion of a meeting participant belonging to the detected human head. In selected embodiments, the first instructions are configured for extracting each body bounding box by extending the head bounding box by predetermined distances in both vertical and horizontal directions to surround the detected human head and at least the upper body portion of the meeting participant belonging to the detected human head. In addition, the first instructions are configured for generating, from each input frame image portion contained within the body bounding box, a participant identification feature embedding which uniquely identifies the meeting participant captured in the body bounding box. In selected embodiments, the first instructions are configured for generating each participant identification feature embedding by applying a deep convolutional neural network (CNN) model to generate a multi-dimensional feature embedding for each body bounding box. In the disclosed system and methodology, the video codec device includes a second processor, a second data bus coupled to the second processor, and a non-transitory, computer-readable storage medium embodying computer program code and being coupled to the first data bus, where the computer program code interacts with a plurality of computer operations and includes second instructions executable by the second processor. In particular, the second instructions are configured for performing person re-identification processing on participant identification feature embeddings generated by the plurality of input camera devices to determine a count of the meeting participants in the video conference room. In selected embodiments, the second instructions are configured for performing person re-identification processing by dividing the plurality of participant identification feature embeddings into a query set and a gallery set, where the query set contains participant identification feature embeddings extracted from body bounding boxes generated from a first input frame captured at a primary camera input device, and where the gallery set contains participant identification feature embeddings extracted from body bounding boxes generated from one or more additional input frames captured at one or more secondary camera input devices; and comparing the query set to the gallery set to identify k top feature embedding matches so that matching feature embeddings are assigned to the same meeting participant.

In yet another form, there is disclosed herein a plurality of camera input devices connected together over a communication network to a video codec device, where each camera input device includes a non-transitory computer readable medium having computer readable program code for performing operations. In operation, the program code at each camera input device is executed to generate a plurality of input frame images taken from different perspectives of the video conference room by the plurality of camera input devices. In addition, the program code at each camera input device is executed to detect, from each input frame image, one or more human heads for any meeting participants captured in the input frame image by applying a machine learning human head detector model to said input image frame. In selected embodiments, each camera input device detects one or more human heads by applying image pre-processing to each input frame image; applying a machine learning human head detector model to each input image frame to generate an output tensor for each detected human head; and applying image post-processing to convert each output tensor to a head bounding box which surrounds a corresponding detected human head. In other embodiments, each camera input device detects one or more human heads by classifying each detected human head as having a frontal, profile, or back head orientation and discarding any detected human head that is classified as a profile or back head orientation before extracting, from each head bounding box, a body bounding box. In addition, the program code at each camera input device is executed to generate, from each detected human head, a head bounding box which surrounds the detected human head. In addition, the program code at each camera input device is executed to extract, from each head bounding box, a body bounding box which surrounds the detected human head and at least an upper body portion of a meeting participant belonging to the detected human head, thereby generating a plurality of body bounding boxes from the plurality of input frame images. In selected embodiments, each camera input device extracts each body bounding box by extending the head bounding box by predetermined distances in both vertical and horizontal directions to surround the detected human head and at least the upper body portion of the meeting participant belonging to the detected human head. In addition, the program code at each camera input device is executed to generate, from each input frame image portion contained within the body bounding box, a participant identification feature embedding which uniquely identifies the meeting participant captured in the body bounding box, thereby generating a plurality of participant identification feature embeddings from the plurality of body bounding boxes. In selected embodiments, each camera input device generates each participant identification feature embedding by applying a deep convolutional neural network (CNN) model to generate a multi-dimensional feature embedding for each body bounding box. As disclosed, the plurality of participant identification feature embeddings are processed by the video code device by performing person re-identification processing on the plurality of participant identification feature embeddings to determine a count of the meeting participants in the video conference room. In selected embodiments, each camera input device generates the head bounding box as a first data structure which includes a first pair of image plane coordinates, a head box width dimension, and a head box height dimension. In such embodiments, each camera input device extracts the body bounding box by generating a second data structure which includes a second pair of image plane coordinates, a body box width dimension, and a body box height dimension.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Unless stated otherwise, terms such as "first" and "second" are used to arbitrarily distinguish between the elements such terms describe. Thus, these terms are not necessarily intended to indicate temporal or other prioritization of such elements.

As will be appreciated by one skilled in the art, the present disclosure may be embodied as a method, system, or computer program product. Accordingly, embodiments of the present disclosure may be implemented entirely in hardware, entirely in software (including firmware, resident software, micro-code, etc.) or in an embodiment combining software and hardware. These various embodiments may all generally be referred to herein as a "circuit," "module," or "system." Furthermore, embodiments of the present disclosure may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the disclosure are described with reference to flowchart illustrations and/or step diagrams of methods, apparatus (systems) and computer program products according to embodiments of the disclosure. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof.

It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Although the disclosure is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The various examples described are provided by way of illustration and should not be construed to limit the scope of the disclosure. Various modifications and changes can be made to the principles and examples described herein without departing from the scope of the disclosure and without departing from the claims which follow.

What is claimed is:

1. A method for identifying meeting participants in a multi-camera video conference room, comprising:
   generating a plurality of input frame images taken from different perspectives of a video conference room by a corresponding plurality of cameras connected together;
   detecting, from an input frame image associated with each camera, one or more human heads for any meeting participants captured in the input frame image by applying a machine learning human head detector model to said input image frame;
   generating, from each detected human head, a head bounding box which surrounds the detected human head;
   extracting, from each head bounding box, a body bounding box which surrounds the detected human head and at least an upper body portion of a meeting participant belonging to the detected human head, thereby generating a plurality of body bounding boxes from the plurality of input frame images;
   generating, from each input frame image portion contained within the body bounding box, a participant identification feature embedding which uniquely identifies the meeting participant captured in the body bounding box, thereby generating a plurality of participant identification feature embeddings from the plurality of body bounding boxes; and
   performing person re-identification processing on the plurality of participant identification feature embeddings to determine a count of the meeting participants in the video conference room,
   wherein performing person re-identification processing comprises:
      dividing the plurality of participant identification feature embeddings into a query set and a gallery set, and
      comparing the query set to the gallery set to identify k top feature embedding matches so that matching feature embeddings are assigned to the same meeting participant,
   wherein the query set contains participant identification feature embeddings extracted from body bounding boxes generated from a first input frame captured at a primary camera, and
   wherein the gallery set contains participant identification feature embeddings extracted from body bounding boxes generated from one or more additional input frames captured at one or more secondary cameras.

2. The method of claim 1, where detecting one or more human heads comprises classifying each detected human head as having a frontal, profile, or back head orientation and discarding any detected human head that is classified as a profile or back head orientation before extracting, from each head bounding box, a body bounding box.

3. The method of claim 1, wherein detecting one or more human heads comprises:
   applying image pre-processing to each input frame image;
   applying a machine learning human head detector model to each input image frame to generate an output tensor for each detected human head; and
   applying image post-processing to convert each output tensor to a head bounding box which surrounds a corresponding detected human head.

4. The method of claim 1, wherein extracting each body bounding box comprises extending the head bounding box by predetermined distances in both vertical and horizontal directions to surround the detected human head and at least the upper body portion of the meeting participant belonging to the detected human head.

5. The method of claim 1, wherein generating each participant identification feature embedding comprises applying a deep convolutional neural network (CNN) model to generate a multi-dimensional feature embedding for each body bounding box.

6. The method of claim 1, wherein the plurality of participant identification feature embeddings are generated at the plurality of cameras, and where a central codec performs person re-identification processing on the plurality of participant identification feature embeddings.

7. A system for identifying meeting participants in a multi-camera video conference room, comprising:

a plurality of camera input devices connected over a communication network to a video codec device,
where each of the camera input devices comprises:
a first processor;
a first data bus coupled to the first processor; and
a non-transitory, computer-readable storage medium embodying computer program code, the non-transitory, computer-readable storage medium being coupled to the first data bus, the computer program code interacting with a plurality of computer operations and comprising first instructions executable by the first processor and configured for:
generating an input frame image taken from a different perspective of a video conference room;
detecting, from an input frame image associated with each camera, one or more human heads for any meeting participants captured in the input frame image by applying a machine learning human head detector model to said input image frame;
generating, from each detected human head, a head bounding box which surrounds the detected human head;
extracting, from each head bounding box, a body bounding box which surrounds the detected human head and at least an upper body portion of a meeting participant belonging to the detected human head; and
generating, from each input frame image portion contained within the body bounding box, a participant identification feature embedding which uniquely identifies the meeting participant captured in the body bounding box; and
where the video codec device comprises:
a second processor;
a second data bus coupled to the second processor; and
a non-transitory, computer-readable storage medium embodying computer program code, the non-transitory, computer-readable storage medium being coupled to the second data bus, the computer program code interacting with a plurality of computer operations and comprising second instructions executable by the second processor and configured for:
performing person re-identification processing on participant identification feature embeddings generated by the plurality of input camera devices to determine a count of the meeting participants in the video conference room,
wherein the second instructions executable by the processor are configured for performing person re-identification processing by:
dividing the plurality of participant identification feature embeddings into a query set and a gallery set,
comparing the query set to the gallery set to identify k top feature embedding matches so that matching feature embeddings are assigned to the same meeting participant,
wherein the query set contains participant identification feature embeddings extracted from body bounding boxes generated from a first input frame captured at a primary camera input device, and
wherein the gallery set contains participant identification feature embeddings extracted from body bounding boxes generated from one or more additional input frames captured at one or more secondary camera input devices.

8. The system of claim 7, wherein the first instructions executable by the processor are configured for detecting one or more human heads by classifying each detected human head as having a frontal, profile, or back head orientation and discarding any detected human head that is classified as a profile or back head orientation before extracting, from each head bounding box, a body bounding box.

9. The system of claim 7, wherein the first instructions executable by the processor are configured for detecting one or more human heads by:
applying image pre-processing to each input frame image;
applying a machine learning human head detector model to each input image frame to generate an output tensor for each detected human head; and
applying image post-processing to convert each output tensor to a head bounding box which surrounds a corresponding detected human head.

10. The system of claim 7, wherein the first instructions executable by the processor are configured for extracting each body bounding box by extending the head bounding box by predetermined distances in both vertical and horizontal directions to surround the detected human head and at least the upper body portion of the meeting participant belonging to the detected human head.

11. The system of claim 7, wherein the first instructions executable by the processor are configured for generating each participant identification feature embedding by applying a deep convolutional neural network (CNN) model to generate a multi-dimensional feature embedding for each body bounding box.

12. A plurality of camera input devices connected together over a communication network to a video codec device, each camera input device comprising a non-transitory computer readable medium comprising computer readable program code for performing operations comprising:
generating a plurality of input frame images taken from different perspectives of a video conference room by the plurality of camera input devices;
detecting, from an input frame image associated with each camera, one or more human heads for any meeting participants captured in the input frame image by applying a machine learning human head detector model to said input image frame;
generating, from each detected human head, a head bounding box which surrounds the detected human head;
extracting, from each head bounding box, a body bounding box which surrounds the detected human head and at least an upper body portion of a meeting participant belonging to the detected human head, thereby generating a plurality of body bounding boxes from the plurality of input frame images, and
generating, from each input frame image portion contained within the body bounding box, a participant identification feature embedding which uniquely identifies the meeting participant captured in the body bounding box, thereby generating a plurality of participant identification feature embeddings from the plurality of body bounding boxes which are processed by the video code device by performing person re-identification processing on the plurality of participant identification feature embeddings to determine a count of the meeting participants in the video conference room,
wherein performing person re-identification processing comprises:

dividing the plurality of participant identification feature embeddings into a query set and a gallery set, and comparing the query set to the gallery set to identify k top feature embedding matches so that matching feature embeddings are assigned to the same meeting participant, wherein the query set contains participant identification feature embeddings extracted from body bounding boxes generated from a first input frame captured at a primary camera, and wherein the gallery set contains participant identification feature embeddings extracted from body bounding boxes generated from one or more additional input frames captured at one or more secondary cameras.

13. The plurality of camera input devices of claim 12, where each camera input device detects one or more human heads by classifying each detected human head as having a frontal, profile, or back head orientation and discarding any detected human head that is classified as a profile or back head orientation before extracting, from each head bounding box, a body bounding box.

14. The plurality of camera input devices of claim 12, where each camera input device detects one or more human heads by:
  applying image pre-processing to each input frame image;
  applying a machine learning human head detector model to each input image frame to generate an output tensor for each detected human head; and
  applying image post-processing to convert each output tensor to a head bounding box which surrounds a corresponding detected human head.

15. The plurality of camera input devices of claim 12, where each camera input device extracts each body bounding box by extending the head bounding box by predetermined distances in both vertical and horizontal directions to surround the detected human head and at least the upper body portion of the meeting participant belonging to the detected human head.

16. The plurality of camera input devices of claim 12, where each camera input device generates each participant identification feature embedding by applying a deep convolutional neural network (CNN) model to generate a multi-dimensional feature embedding for each body bounding box.

17. The plurality of camera input devices of claim 12, where each camera input device generates the head bounding box as a first data structure comprising a first pair of image plane coordinates, a head box width dimension, and a head box height dimension.

18. The plurality of camera input devices of claim 17, where each camera input device extracts the body bounding box by generating a second data structure comprising a second pair of image plane coordinates, a body box width dimension, and a body box height dimension.

\* \* \* \* \*